United States Patent
Chapman, Jr. et al.

(10) Patent No.: US 8,761,912 B1
(45) Date of Patent: *Jun. 24, 2014

(54) SYSTEM FOR REMOTELY MONITORING A TENSIONER AND PROVIDING AN ALARM FOR ANTICIPATED FAILURE AND MAINTENANCE

(71) Applicant: Ashford Technical Software, Inc., Houston, TX (US)

(72) Inventors: Frank Marion Chapman, Jr., Houston, TX (US); Ronald Lyle Brown, Houston, TX (US)

(73) Assignee: Ashford Technical Software, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/012,996

(22) Filed: Aug. 28, 2013

Related U.S. Application Data

(63) Continuation-in-part of application No. 12/766,576, filed on Apr. 23, 2010, now Pat. No. 8,560,096, and a continuation-in-part of application No. 12/766,604, filed on Apr. 23, 2010, now Pat. No. 8,560,097, and a continuation-in-part of application No. 12/766,625, filed on Apr. 23, 2010, now Pat. No. 8,560,098.

(51) Int. Cl.
| | |
|---|---|
| *E21B 47/00* | (2012.01) |
| *G01F 1/00* | (2006.01) |
| *G01F 1/50* | (2006.01) |
| *G01F 23/00* | (2006.01) |
| *G01V 3/18* | (2006.01) |
| *G05B 11/01* | (2006.01) |
| *G05B 15/00* | (2006.01) |
| *G05B 15/02* | (2006.01) |
| *G06F 3/00* | (2006.01) |
| *G06F 17/00* | (2006.01) |
| *G06F 17/30* | (2006.01) |
| *G06F 19/00* | (2011.01) |
| *G05B 19/00* | (2006.01) |
| *G01N 11/00* | (2006.01) |
| *G05B 13/02* | (2006.01) |
| *E21B 43/12* | (2006.01) |

(52) U.S. Cl.
CPC .................. *G05B 19/00* (2013.01); *E21B 43/12* (2013.01); *G01F 1/50* (2013.01); *G01F 23/00* (2013.01); *G01N 11/00* (2013.01); *G05B 13/02* (2013.01); *G05B 15/00* (2013.01); *G05B 15/02* (2013.01); *G06F 17/30* (2013.01)
USPC . 700/83; 700/9; 700/10; 700/12; 166/250.01; 702/9; 702/12; 702/45; 702/47; 702/100; 702/182; 715/215; 715/733

(58) Field of Classification Search
CPC ........... E21B 43/12; G01F 1/50; G01F 23/00; G01N 11/00; G06F 17/30
USPC ............ 700/9, 10, 12, 83; 166/250.01; 702/9, 702/12, 45, 47, 50, 100, 182; 707/790; 715/215, 733
See application file for complete search history.

(56) References Cited

U.S. PATENT DOCUMENTS

| | | | | |
|---|---|---|---|---|
| 4,755,947 A | * | 7/1988 | Braschler et al. ............. | 701/116 |
| 5,465,798 A | | 11/1995 | Edlund et al. | |

(Continued)

*Primary Examiner* — Mohammad Ali
*Assistant Examiner* — Jennifer L Norton
(74) *Attorney, Agent, or Firm* — Buskop Law Group, PC; Wendy Buskop

(57) ABSTRACT

A system for monitoring the status of a plurality of tensioner assemblies and rig motion assemblies from a secondary location. The system not only monitors a status of a tensioner from a secondary location but simultaneously enables preventive maintenance to be ascertained remotely.

21 Claims, 17 Drawing Sheets

(56) References Cited

U.S. PATENT DOCUMENTS

| | | |
|---|---|---|
| 6,176,323 B1 | 1/2001 | Weirich et al. |
| 6,378,628 B1 | 4/2002 | McGuire et al. |
| 8,204,692 B2 * | 6/2012 | Arango et al. .................... 702/9 |
| 2004/0230328 A1 | 11/2004 | Armstrong et al. |
| 2005/0033466 A1 | 2/2005 | Eryurek et al. |
| 2005/0240289 A1 | 10/2005 | Hoyte et al. |
| 2007/0067725 A1 | 3/2007 | Cahill et al. |
| 2009/0044977 A1 | 2/2009 | Johnson et al. |
| 2012/0041574 A1 | 2/2012 | Hsiung et al. |
| 2013/0138254 A1 | 5/2013 | Seals et al. |

* cited by examiner

FIGURE 4A

| | |
|---|---|
| ADMINISTRATIVE DATA STORAGE | 54 |
| ADMINISTRATIVE PROCESS MONITOR | 76 |
| ADMINISTRATIVE SITE MONITOR | 78 |
| ADMINISTRATIVE TASK DEVICE | 80 |
| ADMINISTRATIVE TASK TRANSFER DEVICE | 82 |
| ADMINISTRATIVE CONFIGURATION LIBRARIES | 83 |
| ADMINISTRATIVE PROCESS MONITOR CONFIGURATION LIBRARY | 84 |
| ADMINISTRATIVE SITE MONITOR CONFIGURATION LIBRARY | 86 |
| ADMINISTRATIVE TASK DEVICE CONFIGURATION LIBRARY | 88 |
| ADMINISTRATIVE TASK TRANSFER DEVICE CONFIGURATION LIBRARY | 90 |
| COMPUTER INSTRUCTIONS TO DISPLAY TENSIONER NAMES IN A DROP DOWN BOX USING SELECT TENSIONER DETAIL BUTTON | 87 |
| COMPUTER INSTRUCTIONS TO UPDATE APPROPRIATE FIELDS OF A SELECTED TENSIONER NAME DISPLAYED IN A SELECT TENSIONER DETAIL BUTTON USING A CHANGE TENSIONER DETAIL BUTTON | 89 |
| COMPUTER INSTRUCTIONS FOR LINKING TO A CALENDAR FOR SELECTING A NEW DAMAGE DATE USING NEW DAMAGE DATE BUTTON | 91 |
| COMPUTER INSTRUCTIONS FOR FORMING AN ADMINISTRATIVE DATABASE | 92 |
| COMPUTER INSTRUCTIONS FOR FORMING AN ADMINISTRATIVE WEB SERVER TO RECEIVE AND STORE INFORMATION TRANSMITTED OVER THE NETWORK AND TO PROVIDE STORAGE IN THE ADMINISTRATIVE DATA STORAGE | 93 |
| COMPUTER INSTRUCTIONS TO DISPLAY DAMAGE DETAIL INFORMATION FOR THE DATE DISPLAYED IN A NEW DAMAGE DATE BUTTON USING A CHANGE DAMAGE DATE BUTTON | 94 |
| COMPUTER INSTRUCTIONS TO CALL FOR THE COMPUTATION OF TENSION ROPE DAMAGE AND TO CLEAR DATES DISPLAYED IN THE PENDING TENSIONER PROCESSING DISPLAY USING COMPUTE DAMAGE BUTTON | 95 |
| COMPUTER INSTRUCTIONS TO CONNECT TO A MAINTENANCE MENU USABLE TO MAINTAIN TENSIONERS CONFIGURATION AND MAINTAIN THE WELL AND TENSION ROPE INFORMATION USING A MAINTENANCE MENU BUTTON | 99 |
| COMPUTER INSTRUCTIONS FOR RECEIVING, VERIFYING, AND STORING AT LEAST ONE TENSION ROPE SIGNAL | 110 |
| COMPUTER INSTRUCTIONS FOR RECEIVING, VERIFYING AND STORING HEAVE DATA FOR A PREDETERMINED UNIT OF TIME THAT IS TRANSMITTED FROM THE SITE TO THE ADMINISTRATIVE WEB SERVER VIA THE NETWORK | 112 |
| COMPUTER INSTRUCTIONS FOR CALCULATING APPLIED TENSION FROM TENSIONER PRESSURES AND TENSIONER INFORMATION | 114 |
| COMPUTER INSTRUCTIONS FOR TAKING SAMPLES OF AVERAGE HEAVE DATA AND CALCULATING THE COMBINED AVERAGE HEAVE DATA AND HEAVE COUNT OVER A SPECIFIED UNIT OF TIME | 116 |
| COMPUTER INSTRUCTIONS FOR COMBINING THE TENSION ROPE TENSION, COMBINED HEAVE DATA AND THE HEAVE COUNT FOR A PRESELECTED UNIT OF TIME WITH SITE CONFIGURATION INFORMATION, THE SITE CONFIGURATION INFORMATION COMPRISING WELL INFORMATION, TENSIONER INFORMATION AND TENSION ROPE INFORMATION, TO ESTIMATE DAMAGE TO THE TENSION ROPE OF THE TENSIONER ASSEMBLY AT THE SITE | 117 |

| | |
|---|---|
| COMPUTER INSTRUCTIONS 540 FOR PRESENTING THE ESTIMATED DAMAGE TO THE TENSION ROPE COMPRISING: (I) PERCENTAGE OF WEAR REMAINING, (II) TENSIONER STATUS, (III) ESTIMATED CUT (OR REPLACE) DATE, AND (IV) TENSIONER INFORMATION | 540 |
| COMPUTER INSTRUCTIONS TO REPLACE A COMBINED AVERAGE PERIOD (PER DAY) WITH A NEW COMBINED AVERAGE PERIOD USING A SAVE PERIOD ONLY BUTTON | 900 |
| COMPUTER INSTRUCTIONS TO REPLACE AVERAGE TENSION IN KIPS WITH NEW TENSION IN KIPS FOR EACH TENSIONER USING A SAVE TENSIONER ONLY BUTTON | 902 |
| COMPUTER INSTRUCTIONS TO SAVE BOTH COMBINED AVERAGE PERIOD AND AVERAGE TENSION IN KIPS, NAMELY, REPLACING A PERIOD WITH A NEW PERIOD USING A SAVE ALL BUTTON WHILE SIMULTANEOUSLY REPLACING TENSION IN KIPS WITH NEW TENSION IN KIPS FOR EACH TENSIONER | 904 |
| COMPUTER INSTRUCTIONS TO CALCULATE ALL PENDING DAMAGE PROCESSING USING A RECOMPUTED BUTTON | 906 |
| COMPUTER INSTRUCTIONS TO CANCEL (THROW AWAY) ANY INPUT AND REFRESH THE SCREEN USING A CANCEL BUTTON | 908 |
| COMPUTER INSTRUCTIONS TO LINK TO A CALENDAR USING A NEW PROCESSING DATE BUTTON | 910 |
| COMPUTER INSTRUCTIONS TO UPDATE THE DISPLAY WITH DATA ASSOCIATED WITH THE DATE SELECTED IN THE NEW PROCESSING DATE BUTTON USING A CHANGE DATE BUTTON | 912 |
| COMPUTER INSTRUCTIONS FOR MAINTAINING THE STATUS OF EACH TENSIONER BY INITIALLY ASSIGNING A TENSION ROPE TO A TENSIONER, RECORDING THE DATE IF A TENSION ROPE HAS BEEN SLIPPED AND CUT, RECORDING THE DATE AND NEW TENSION ROPE NAME IF A TENSION ROPE HAS BEEN REPLACED, OR RECORDING DATES WHEN THE INDIVIDUAL TENSIONER IS OUT OF SERVICE | 920 |
| COMPUTER INSTRUCTIONS FOR IDENTIFYING NEW TENSION ROPES TO THE SYSTEM | 922 |
| COMPUTER INSTRUCTIONS FOR IDENTIFYING WELL DRILLING PROGRAMS TO THE SYSTEM | 924 |
| COMPUTER INSTRUCTIONS FOR IDENTIFYING THE INITIAL PARAMETERS OF EACH TENSIONER | 926 |
| COMPUTER INSTRUCTIONS FOR IMPLEMENTING THE USER DEFINED GENERAL DAMAGE FORMULA | 928 |
| COMPUTER INSTRUCTIONS FOR STORING THE SPECIFIC FORMULA COEFFICIENTS WITH SELECTION IDENTIFIERS | 929 |
| COMPUTER INSTRUCTIONS FOR PRESENTING THE DAILY TENSIONER HISTORY OF EACH TENSIONER | 930 |
| COMPUTER INSTRUCTIONS FOR RECORDING USER DEFINED TENSION ROPE INSPECTION REPORTS | 932 |
| COMPUTER INSTRUCTIONS FOR PRESENTING TENSION ROPE HISTORY | 934 |

*FIGURE 4B*

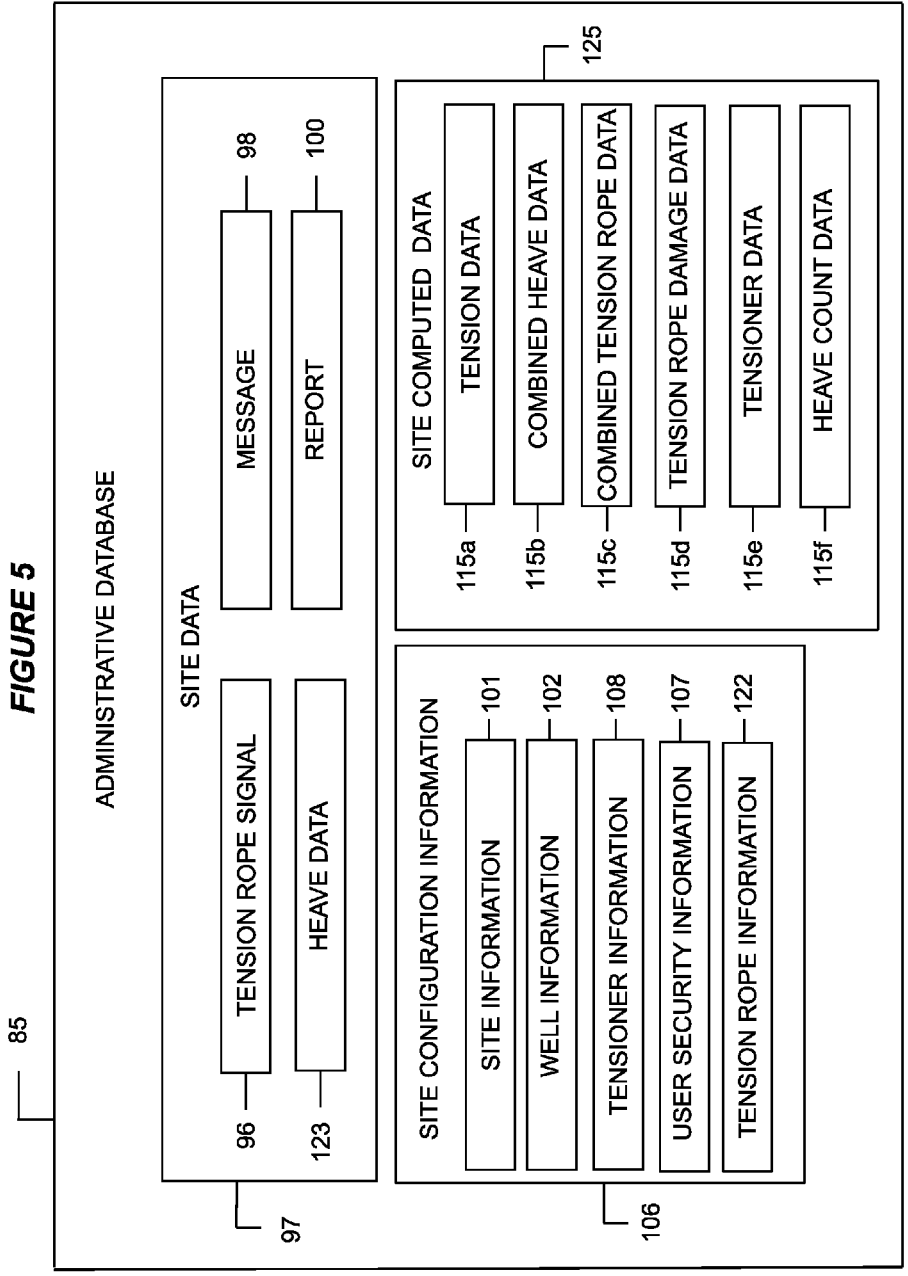

TENSIONER REVIEW

MOST CRITICAL TENSIONER

| | |
|---|---|
| DAMAGE DATE | 2013-01-01 — 572 |
| TENSIONER | TEN_1 — 574 |
| WEAR (%) | 36.7 — 576 |
| DAYS ON TENSION | 96 — 578 |
| SLIP STATUS | <50 % WEAR — 580 |
| ESTIMATED DAYS REMAINING | 262 — 582 |
| ESTIMATED END DATE | 2013-09-19 — 584 |

*FIGURE 7A*

TENSIONER REVIEW
STATUS SUMMARY

| TENSIONER | SLIP STATUS | DAYS FROM LAST SLIP | WEAR REMAINING (%) | EST. CUT DATE (YYYY-MM-DD) |
|---|---|---|---|---|
| TEN_1 | <50% WEAR | 154 | 68.1 | 2014-04-27 |
| TEN_2 | <25% WEAR | 96 | 78.1 | 2014-05-11 |
| TEN_3 | <25% WEAR | 96 | 83.1 | 2014-08-31 |
| TEN_4 | <25% WEAR | 96 | 78.1 | 2014-05-11 |

- 700 — FORMING A DATABASE FOR TENSION ROPE SIGNALS AND ACCELEROMETER SIGNALS FOR A FLOATING VESSEL IN A SITE DATA STORAGE CONNECTED TO A SITE PROCESSOR
- 702 — INSTALLING A PLURALITY OF SITE CONFIGURATION LIBRARIES IN THE DATABASE
- 704 — RECEIVING AND STORING TENSION ROPE SIGNALS INTO THE DATABASE FOR AT LEAST ONE TENSION ROPE SENSOR AND RECEIVING AND STORING ACCELEROMETER SIGNALS FROM AN ACCELEROMETER ON THE FLOATING SITE
- 705 — VERIFYING THAT THE TENSION ROPE SIGNALS AND ACCELEROMETER SIGNALS HAVE BEEN RECEIVED BY THE SITE DATA STORAGE
- 706 — COMPUTING HEAVE DATA COMPRISED OF AVERAGE PERIOD AND AVERAGE DISTANCE TRAVELLED BY THE FLOATING OIL RIG FOR A PRESELECTED UNIT OF TIME FROM THE ACCELEROMETER SIGNALS FOR A FLOATING SITE
- 708 — CONNECTING AN ADMINISTRATIVE SERVER TO THE SITE PROCESSOR, WHEREIN THE ADMINISTRATIVE SERVER HAS AN ADMINISTRATIVE DATA STORAGE, AN ADMINISTRATIVE PROCESSOR AND AN ADMINISTRATIVE DATABASE
- 710 — INSTALLING A PLURALITY OF CONFIGURATION LIBRARIES IN THE ADMINISTRATIVE SERVER
- 713 — FORMING AN ADMINISTRATIVE WEB SERVER IN THE ADMINISTRATIVE SERVER

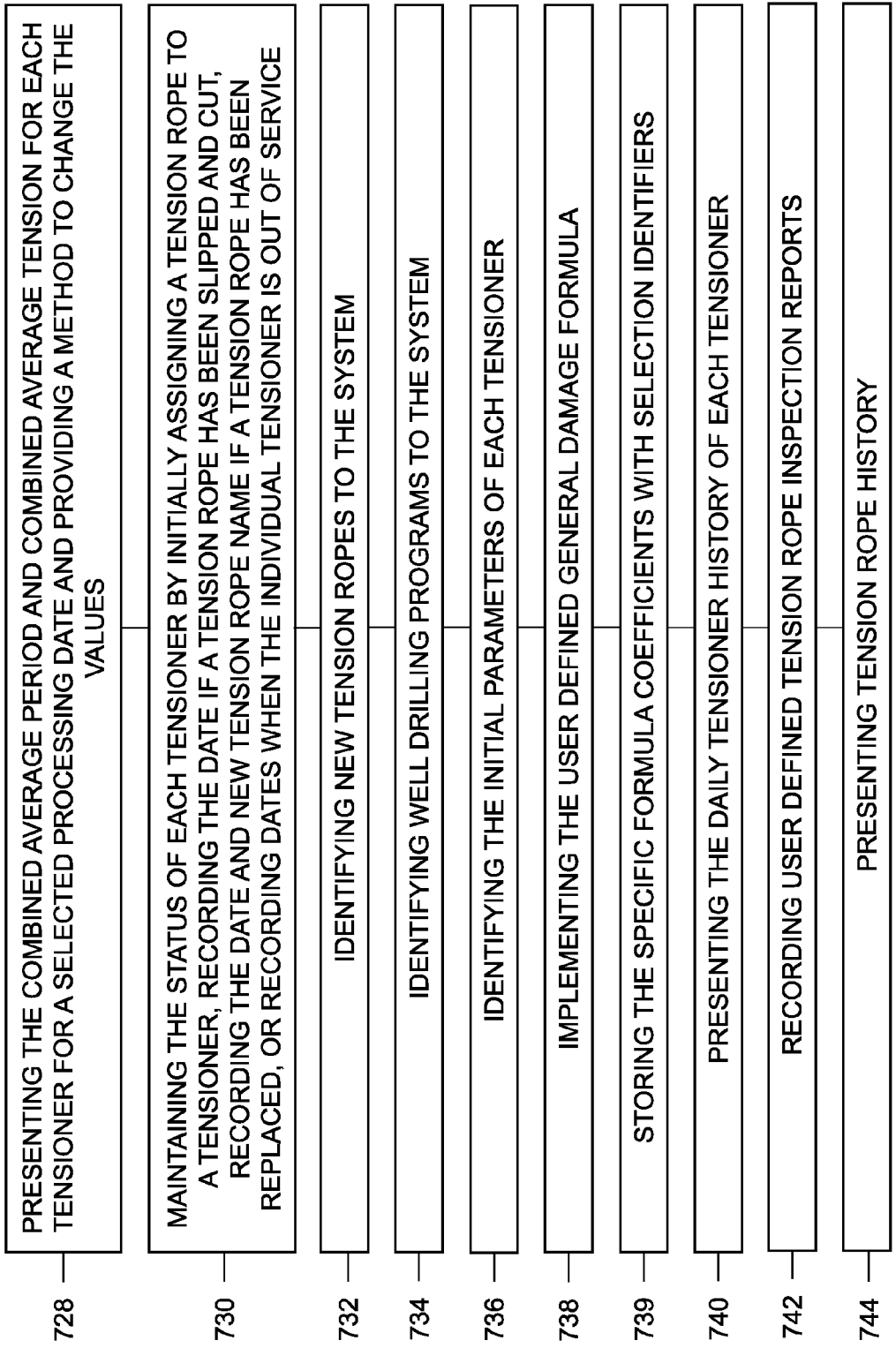

SYSTEM FOR REMOTELY MONITORING A TENSIONER AND PROVIDING AN ALARM FOR ANTICIPATED FAILURE AND MAINTENANCE

CROSS REFERENCE TO RELATED APPLICATIONS

The present application is a Continuation in Part of U.S. patent application Ser. No. 12/766,576 filed on Apr. 23, 2010, entitled "METHOD FOR REMOTELY MONITORING A SITE FOR ANTICIPATED FAILURE AND MAINTENANCE WITH A PLURALITY OF CONTROLS," U.S. patent application Ser. No. 12/766,604 filed on Apr. 23, 2010, entitled "COMPUTER ASSISTED METHOD FOR REMOTELY MONITORING A SITE FOR ANTICIPATED FAILURE AND MAINTENANCE WITH A PLURALITY OF CONTROLS," and U.S. patent application Ser. No. 12/766,625 filed on Apr. 23, 2010, entitled "SYSTEM FOR REMOTELY MONITORING A SITE FOR ANTICIPATED FAILURE AND MAINTENANCE WITH A PLURALITY OF CONTROLS" and". These references are hereby incorporated in their entirety.

FIELD

The present embodiments generally relate to a system for monitoring a tensioner status from a secondary location for a floating drilling rig, while simultaneously enabling preventive maintenance of the tensioner.

BACKGROUND

A need exists for a simple system operable without the need for training to detect changes in state of tensioner rope used with tensioners on floating drill ships, floating production platforms, and floating workover platforms usable with oil and natural gas wells. The invention allows monitoring and alarms for maintenance of the tensioner to be not only viewed locally, within a few feet of a site, or viewed remotely, thousands of miles away, to not only provide alarms for damage and permit viewing of damage but simultaneously allow for maintenance planning.

A tensioner that is usable with the system can be a riser tensioner.

A need exists for a system to continuously and automatically monitor offshore tensioners for floating sites used in oil field operations to ensure a safe, efficient, and cost effective drilling, workover, and production operation.

A need exists for a system for preventive maintenance of tensioners, elimination of costly downtime, environmental protection, and an increase in safety by identifying tensioner rope in need of maintenance and replacement.

A further need exists for a system that allows management, drilling experts, and other operations personnel to remain physically remote from a drilling site, or a workover site while having easy and timely access to the status of tensioners at a drilling operation.

The present embodiments meet these needs.

BRIEF DESCRIPTION OF THE DRAWINGS

The detailed description will be better understood in conjunction with the accompanying drawings as follows:

FIGS. 4A-4B represent computer instructions within the administrative data storage.

FIG. 5 is a diagram of the administrative database.

FIGS. 7A-7D are a display of a web page produced by the system depicting a review of tensioner information for all tensioners at a floating site.

FIGS. 11A-11C depict the series of steps of an embodiment of the method performed with the system.

Figure 1:
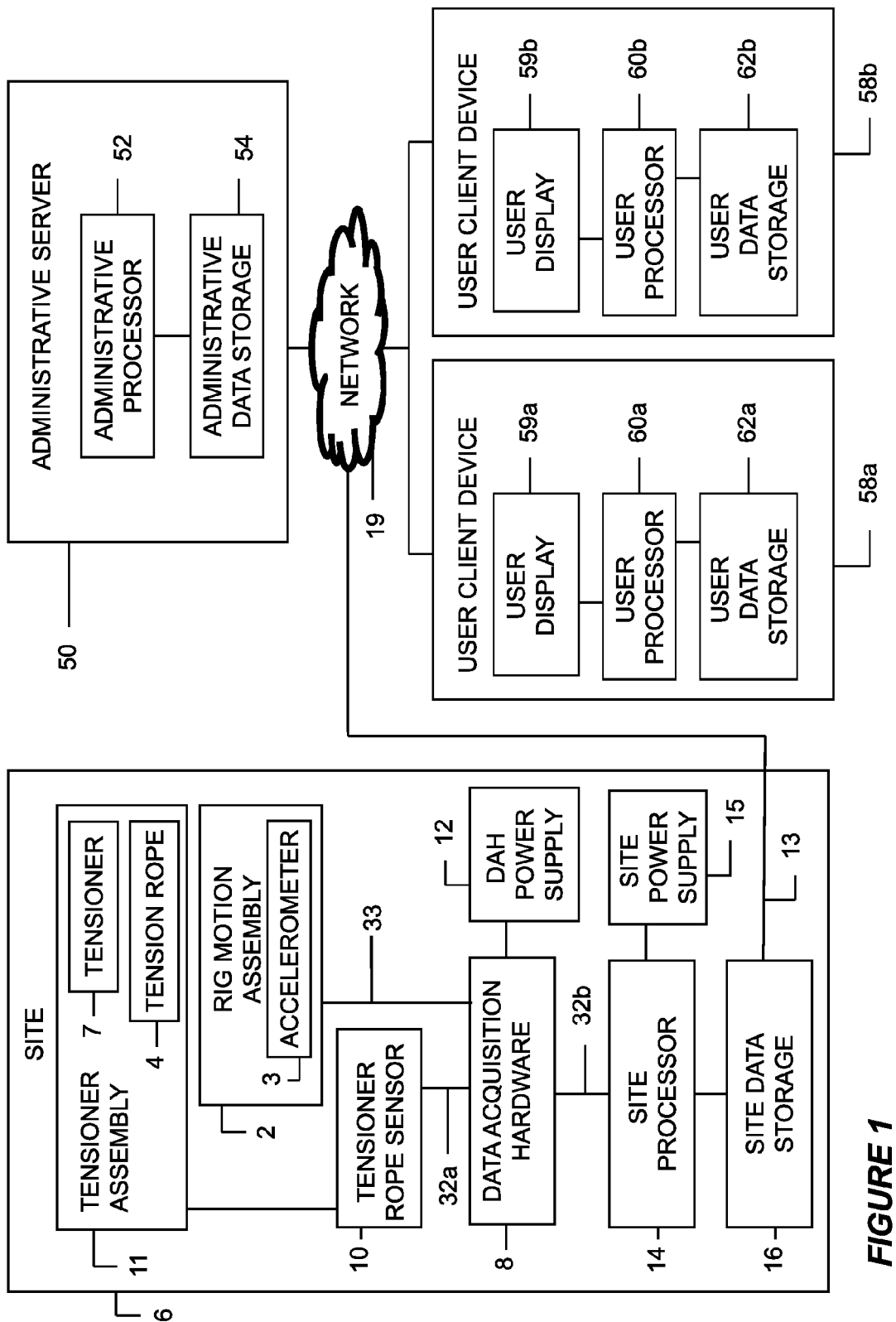
FIG. 1 is a diagram of the system.

The present embodiments are detailed below with reference to the listed Figures.

DETAILED DESCRIPTION OF THE EMBODIMENTS

Before explaining the present system in detail, it is to be understood that the system is not limited to the particular embodiments and that it can be practiced or carried out in various ways.

The present embodiments relate to a system to monitor a status from a secondary location of a tensioner on a floating drill ship, on a floating semisubmersible on a spar, or on another floating site for drilling natural gas or oil wells, providing workover of oil wells, or providing production of those wells while simultaneously enabling preventive maintenance for the tensioner on the site.

As used herein, the term "floating site" can refer to a floating drill ship, floating production platform, floating workover platform, floating drilling platform, floating platform, floating rig, floating semisubmersible, floating vessel, combinations thereof, or the like.

The system can be used to continuously and automatically monitor tensioners to ensure safe, efficient, and cost effective drilling operations. Repairing drilling and safety equipment during a drilling operation can be time consuming and costly. For example, in an offshore drilling operation, replacing a broken rope for a tensioner may only cost $50,000 but can cause two or three days of lost drilling time and tens of thousands of dollars in added costs.

The system can be used for tracking tensioner utilization, rig movement, to provide for preventative maintenance, elimination of costly downtime, environmental protection, and an increase in safety by identifying ropes in need of maintenance or replacement. For example, tensioner failure during a drilling operation can endanger personnel, endanger equipment, and can have a severe impact on the environment.

The system can save fossil fuels by improving operational efficiency and eliminating unnecessary activities.

The system can protect the environment by eliminating the accidental release of toxic material that can result from tensioner failure.

The system can monitor the status of a tensioner assembly and a rig motion assembly at a site from a secondary location. The site can be a floating site. The tensioner assembly can have at least one tensioner and a tension rope. The rig motion assembly has at least one accelerometer. The system simultaneously enables monitoring and preventive maintenance on the tensioner. The system not only monitors a status of a tensioner from a secondary location but simultaneously enabling preventive maintenance to be ascertained remotely.

The system can use a data acquisition hardware for receiving and storing sensor data from (i) a tensioner rope sensor attached to the tensioner pressure line to monitor tensioner pressure and produce tension rope signals, (ii) an accelerometer sensor attached to a floating oil rig, which in embodiments is a floating drilling rig or a floating workover rig or a floating production rig to monitor acceleration of the floating oil rig producing acceleration signals in one or more translational directions such as an up/down direction, side to side, or a forward to back direction.

The system can include a site processor in communication with a site data storage for receiving tension rope signals and acceleration signals in a translational direction Computer instructions in the site data storage are used for forming a database for the tension rope signals and acceleration signals in a translational direction. Computer instructions are used to compute period and distance travelled for the floating site using the acceleration signals in a translational direction and signal processing algorithms and empirical coefficients forming heave data consisting of an average period and average distance travelled by the floating oil rig for a preselected unit of time.

The system can include an analog input monitor connected to the site processor as well as a data transfer device in the site data storage.

In an embodiment, an analog input monitor can have computer instructions in the site data storage for monitoring tensioner rope sensor data and acceleration data from the data acquisition equipment.

In an embodiment, the data transfer device in the site data storage can have computer instructions in the site data storage to transmit the tension rope signals stored by the analog input monitor, the computed heave data, or combinations thereof.

In an embodiment, the data transfer device can have computer instructions in the site data storage to verify a transfer of the tensioner signals, the computed heave data, or combinations thereof.

In an embodiment, the data transfer device can have computer instructions to transmit at least one message and at least one report stored by an analog input monitor, a data transfer device, the site process monitor and the site task device.

The data transfer device can verify that a transfer of site data consisting of tension rope signals, heave data, reports, and messages is complete. The data transfer device can verify the occurrence of a transfer by receiving either a positive response or a negative response from the administrative server.

The data transfer device can mark site data, which can include: tension rope signals, heave data, reports, and messages as transferred once the transfer occurs. If a positive response is received, the data in the database can be marked as transferred. If a negative response is received, the data is not marked as transferred and additional transfer attempts can be made at a later time. Marking of the information and data can occur by setting a data transfer indicator associated with the particular data item in the database.

In an embodiment, the site task device can have computer instructions in the site data storage to generate a report on disk utilization, computer instructions in the site data storage to execute an operating system utility command, or computer instructions in the site data storage to perform another computer system maintenance activity. Another computer system maintenance activity can create a list of the programs running on the computer. The list can include the memory and central processor utilization for each program running on the computer.

The system can have a site process monitor in the site data storage for monitoring the analog input monitor, the data transfer device, and the site task device.

The site process monitor can start or end all of the other monitors and devices.

In an embodiment, the site process monitor can have computer instructions in the site data storage to monitor a status of the analog input monitor, the data transfer device, the site task device, or combinations thereof. This multiple device monitoring occurs by periodically polling each monitor or device to determine if it is currently running and if it is functioning correctly.

The system can have a plurality of configuration libraries.

The plurality of configuration libraries can include a tensioner pressure library containing a conversion table or a conversion formula for performing a calculation enabling a conversion of pressure on the tension rope to the tension on the tension rope in kips.

The system can also include an acceleration library containing formula coefficients and conversion parameters for computing average period and average distance travelled by the floating site using the up and down motion of the floating site over waves, which is also known as heave.

The configuration libraries can include a site task device configuration library, a data transfer device configuration library, and a site process monitor configuration library.

In an embodiment, the site task device configuration library can include the site identifier, the database connection information, and the wait interval for checking to see if there are any tasks to perform.

In an embodiment, the data transfer device configuration library can include the site identifier, the database connection information, the wait interval between data transfers, and the maximum number of data elements transferred in any one transfer cycle as one of the plurality of libraries.

In an embodiment, the site process monitor configuration library can include the site identifier, the database connection information, an identifier for each process to be monitored including a type of process indicator, the maximum allowable restarts for any failing process, the time interval for checking on the monitored processes, and a system startup hold-off time interval.

The system can have site web server computer instructions in the site data storage to allow web access to the site data storage, site web server computer instructions in the site data storage to receive a request for status of the site processor, or combinations thereof.

The request for site processor status can take the form of a web report. The web report can summarize the most recent messages and reports that were generated by the various monitors and devices, the last time each monitor completed a cycle, and the last time any sensor data was sent to the administrative server.

The system can include computer instructions in the site data storage to create and store at least one report from the analog input monitor, the data transfer device, the site task device, and the site process monitor; and computer instructions for creating and storing at least one message from the analog input monitor, the data transfer device, the site task device, and the site process monitor.

At a secondary location, the system can have an administrative server in communication with a site via a network, such as the Internet. The administrative server can have an administrative processor.

It is important to make a distinction between the data that can be generated at the site and the data that can be ultimately presented to the end user. The sensor data can be captured by the site processor and can be viewed as raw data. This raw data can be transferred to the administrative server and stored. The administrative server can generate various user reports and displays from this raw data.

The site processor can also be used to perform calculations on the raw data from the accelerometer and produce heave data, and then transfer the heave data to the administrative server. Both activities can happen simultaneously.

The administrative server can compute useful information with the combination of the raw data on the tension rope, the heave data, and site information by performing various analyses, correlations, and computations on the received data or information, and presenting this information to the end user, so that the user can easily and quickly evaluate the tensioner status and other information.

It is not anticipated that an end user have access to the site processor or that there is a local program or function on the site processor for the end user to use. An end user at the site, like other remote end users, can log onto an administrative server to view information regarding the tensioner and tension rope information at the drilling site.

The system can have an administrative data storage in the administrative server. The administrative data storage can have an administrative process monitor, an administrative site monitor, an administrative task device, or an administrative task transfer device.

The administrative process monitor can initiate and monitor the administrative site monitor, the administrative task device, and the administrative task transfer device.

The administrative process monitor can periodically check on the status of each monitor and device. If one of the monitors or the devices is malfunctioning, the administrative process monitor can restart each malfunctioning monitor or device.

The administrative site monitor can periodically send a message to each site being monitored to determine if the site is functioning correctly and that the communication link to the site is working. If the administrative site monitor does not receive a response from the particular site, the administrative site monitor can generate a message in the administrative server database.

The administrative task device can be similar to the site task device. The administrative task device can perform various utility tasks on the administrative server. The administrative task device can check the database to see if there are any tasks it should perform. If a task is found, the administrative task device can perform the task and report the results to the database.

The administrative task transfer device can transfer tasks to be performed on one of the sites to the site's database. The administrative task transfer device can check the administrative database to see if there are any tasks to transfer to one of the sites. If a task is found, the administrative task transfer device can transfer the task to the appropriate site database. If the transfer is successful, the task can be marked in the database as having been transferred.

The administrative server can have a plurality of administrative configuration libraries.

The libraries can include an administrative process monitor configuration library, a site monitor configuration library, a task device configuration library, a task transfer device library, or combinations thereof.

The administrative process monitor configuration library can include information, such as an identifier for each process to be monitored including a type of process indicator, database connection information, the maximum allowable number of restarts for any failing process, the time interval for checking the processes, a system startup hold-off time interval, or combinations thereof.

The site monitor configuration library can include information, such as an identifier for each site being monitored, database connection information, the time wait interval between site monitoring requests.

The administrative task device configuration library can include database connection information, or information related to the time wait interval between checks to see if there are any tasks to perform, or combinations thereof.

The administrative task transfer device configuration library can include database connection information, or information on the time wait interval between checks to see if there are any tasks to transfer to various sites, or combinations thereof.

The administrative data storage can have computer instructions for forming an administrative database.

The administrative database can store site data consisting of tension rope signals, heave data, reports and messages from the site. The administrative database can include a name of each tensioner at the site and each tension rope at the site being monitored and age, and specification information, such as diameter and name of certification.

The administrative database can also store site configuration data consisting of site information, well information, tensioner information, user security information and tension rope information.

The administrative data storage can have computer instructions for forming an administrative web server. The administrative web server can receive and store the site data to the administrative data storage. The site data can be transmitted from the site to the administrative web server via the network.

The administrative data storage can include computer instructions for receiving, verifying, and storing at least one tension rope signal.

The administrative data storage can include computer instructions for receiving, verifying and storing a heave data for a preselected unit of time that is transmitted from the site to the administrative web server via the network.

The administrative data storage has computer instructions for calculating applied rope tension in KIPS from rope tension signals (pressure) and site configuration information.

The administrative data storage can have computer instructions for taking samples of average heave data and calculating the combined average heave data and heave count over time.

The administrative data storage can have computer instructions for computing estimated damage using a user defined formula combining the tension rope tension, combined heave data, and the heave count for a preselected unit of time with site configuration information, the site configuration information comprising well information, tensioner information and tension rope information, to the tension rope of the tensioner assembly at the site.

The administrative data storage can have computer instructions for presenting the estimated damage to the tension rope including (i) percentage of tension rope wear remaining, (ii) tensioner status, (iii) estimated cut (or replace) date, and tensioner information.

Site information can include details about the site, such as the location of the drilling rig, the IP address, rig identification number, or combinations thereof.

The system and method can allow a user to select a tensioner for review and then link to the tensioner maintenance options, such as slip rope, replace rope or place the tensioner out of service.

The system and method can allow a user to view and edit a user defined average period of the floating site and the average tension for each tensioner for a specified unit of time for use in the damage calculation.

The system and method can allow a user to select a previously defined tension rope when replacing a tension rope associated with a given tensioner.

The system and method can allow a user to enter a new rope when replacing a tension rope associated with a given tensioner if the desired new tension rope has not already been entered.

The system and method can allow a user to select and edit an existing tension rope or define a new tension rope to the system for use with the tensioners.

The system and method can allow a user to select and edit an existing well's drilling parameters or enter a new well and its parameters. Well parameters can include the start of drilling, the estimated end of well and the actual end of well date.

The system and method can allow a user to select a tensioner during the set up of the system as well as modify its operating parameters during operation.

The system and method can allow a user to report on view tensioner maintenance history tension rope history by maintaining damage data by tensioner and by tension role.

The system and method can allow a user to incorporate a user defined general damage formula.

The system and method can allow a user to define and store damage formula coefficients to the user's general damage formula. The coefficients can be one per rope diameter or one per floating site.

The system and method can allow a user to record user defined inspection reports. Inspection reports can be comprised of (i) initial inspections, (ii) daily inspections, and (iii) final inspections.

The system can have at least one user client device in communication with the administrative server. Each user client device can be in communication with at least one network. Each user client device can have a user display, a user processor and a user data storage in communication with the user processor, for viewing status of the estimated damage remote to the drilling site.

Turning now to the Figures, FIG. 1 is a diagram of the overall system.

The system can include a site 6. The site can be a floating site, such as a floating offshore oil rig, a drill ship, a semisubmersible, a SPAR, a floating platform, or the like.

The system can include a tensioner assembly 11 and a rig motion assembly 2 at the site 6.

The tensioner assembly 11 can be made up of at least one tensioner 7 and a tension rope 4. In one or more embodiments, the tensioner can be a riser tensioner.

Tension rope can be steel cable, that is braided or twisted, and can have a diameter from 1 inch to 3 inches. In embodiments, the tension rope can be rope, chain or combinations thereof.

The site can include data acquisition hardware 8 for receiving and storing sensor data from (i) a tensioner rope sensor 10 attached to the tensioner pressure line to monitor tensioner pressure and produce tension rope signals 32a, (ii) an accelerometer 3 as part of a rig motion assembly attached to a tensioner pressure line to monitor acceleration of the site producing acceleration signals 33 in a translational direction.

A site processor 14, such as a computer, can be in communication with a site data storage 16 for receiving tension rope signals 32b and acceleration signals in a translational direction from the tensioner rope sensor. The site processor 14 can receive power from a site power supply 15.

The data acquisition hardware can receive power from a data acquisition hardware power supply 12.

The site data storage can communicate information 13 to an administrative server 50 via a wired or wireless connection to a network 19, which can be the internet.

The administrative server 50 can communicate over the network 19 for communication with one or more user client devices 58a, 58b.

The administrative server 50 can include an administrative processor 52 and administrative data storage 54. The server can be a computer with data storage.

The user client devices 58a, 58b can each have a user display 59a, 59b in communication with a user processor 60a, 60b and a user data storage 62a, 62b.

Figure 2:
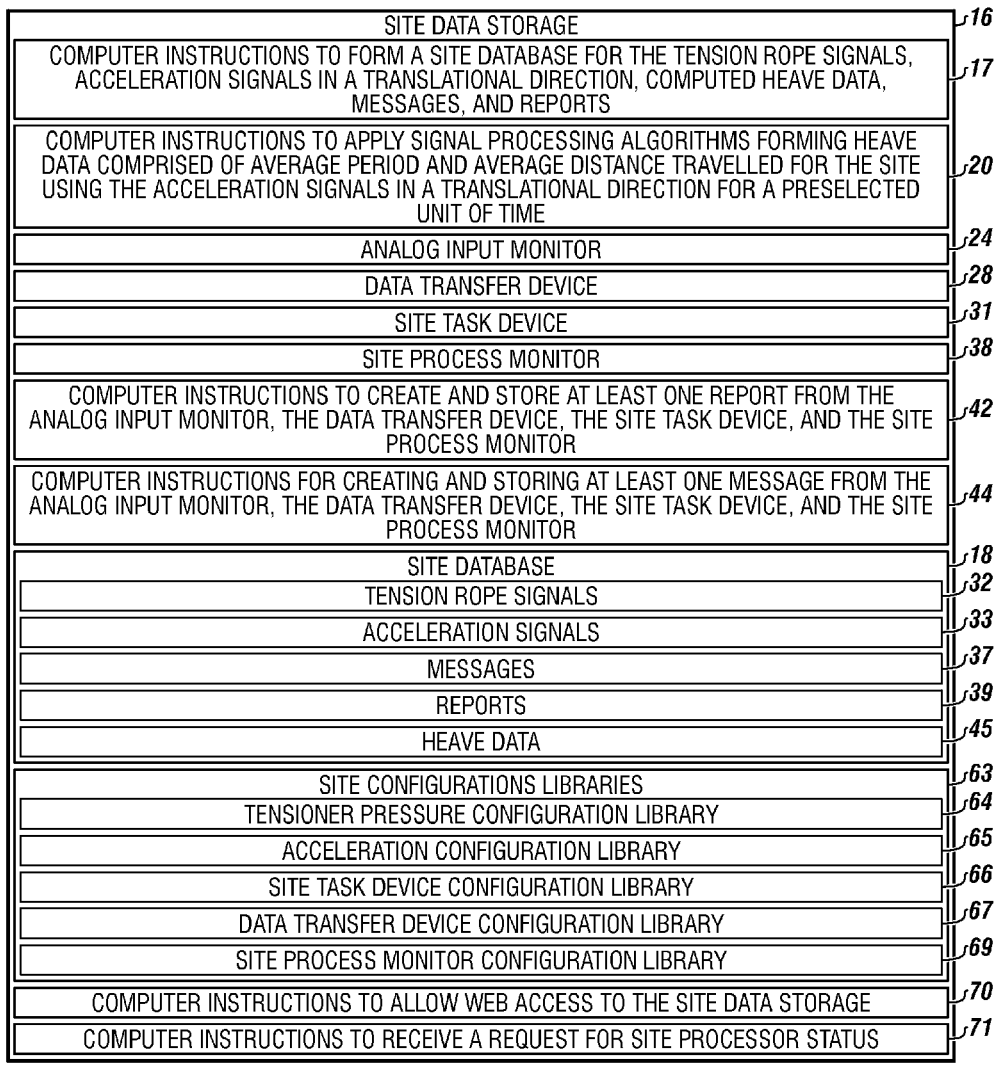
FIG. 2 is a diagram of a site data storage usable with the system.

FIG. 2 is a diagram of the computer instructions within the site data storage.

The site data storage 16 can include computer instructions 17 to form a site database for the tension rope signals, acceleration signals in a translational direction, computed heave data, messages, and reports.

The site data storage 16 can include computer instructions 20 to apply signal processing algorithms forming heave data comprised of average period and average distance travelled for the site using the acceleration signals in a translational direction for a preselected unit of time.

The site data storage can include an analog input monitor 24, which can be connected to the site processor; a data transfer device 28; and a site task device 31.

The site data storage can include a site process monitor 38 for monitoring the analog input monitor, the data transfer device, and the site task device.

The site data storage can include computer instructions 42 to create and store at least one report from the analog input monitor, the data transfer device, the site task device, and the site process monitor.

The site data storage can include computer instructions 44 for creating and storing at least one message from the analog input monitor, the data transfer device, the site task device, and the site process monitor.

The site data storage can include site web server computer instructions, such as computer instructions 70 to allow web access to the site data storage.

The site data storage can include computer instructions 71 to receive a request for site processor status.

The site data storage can include a site database formed by computer instruction 17.

The site database can include tension rope signals 32, acceleration signals 33, messages 37, reports 39, and heave data 45.

The system can use a plurality of site configuration libraries 63 in the site data storage.

The site configurations libraries 63 can include a tensioner pressure configuration library 64, an acceleration configuration library 65, a site task device configuration library 66, a data transfer device configuration library 67, and a site process monitor configuration library 69.

Examples of the information in these libraries can include the software driver associated with the data acquisition hardware, the database connection information, the hardware polling cycle, or the masks to indicate unused analog I/O channels.

Figure 3:
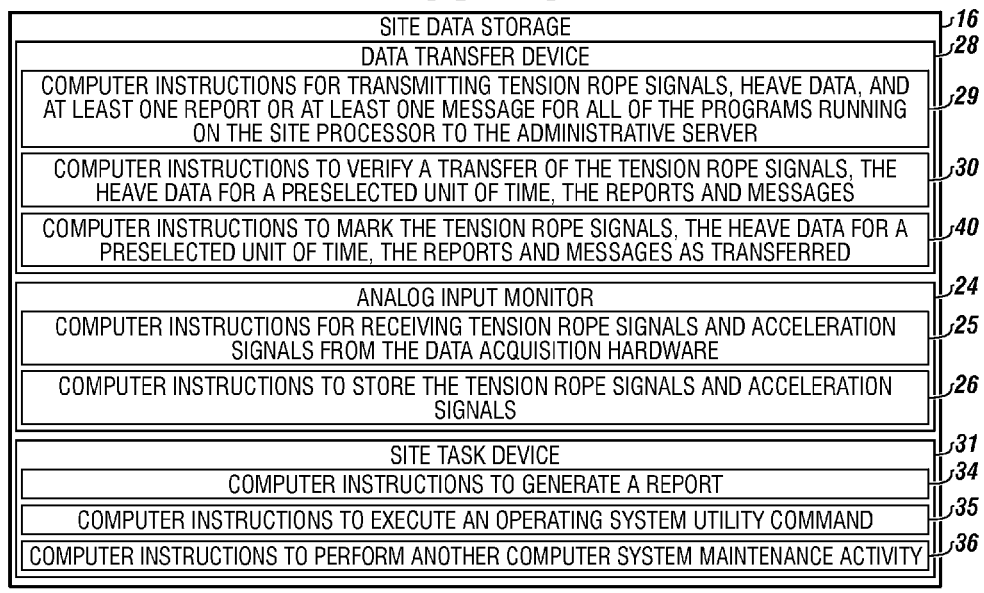
FIG. 3 is a detail of computer instructions within the site data storage.

FIG. 3 is a depiction of the computer instructions within the monitors and devices of the site data storage.

The site data storage 16 can include a data transfer device 28. The data transfer device can include computer instructions 29 for transmitting tension rope signals, heave data, and at least one report or at least one message for all of the programs running on the site processor to the administrative server.

The data transfer device 28 can have computer instructions 30 to verify a transfer of the tension rope signals, the heave data for a preselected unit of time, the reports and messages.

The data transfer device 28 can include computer instructions 40 to mark the tension rope signals, the heave data for a preselected unit of time, the reports and messages as transferred.

The site data storage 16 can include an analog input monitor 24. The analog input monitor can include computer instructions 25 for receiving tension rope signals and acceleration signals from the data acquisition hardware.

The analog input monitor 24 can have computer instructions 26 to store the tension rope signals and acceleration signals.

The site data storage can include a site task device 31.

The site task device 31 can include computer instructions 34 to generate a report, such as on disc utilization; computer instructions 35 to execute an operating system utility command; and/or computer instructions 36 to perform another computer system maintenance activity.

FIGS. 4A and 4B are a diagram of the administrative data storage.

The administrative data storage 54 can include an administrative process monitor 76 and an administrative site monitor 78. The administrative data storage can have computer instructions to perform the steps of an administrative process monitor. Once the administrative process monitor is created, the administrative data storage can have computer instructions to perform the steps of an administrative site monitor.

The administrative data storage 54 can include an administrative task device 80 and an administrative task transfer device 82.

Once the administrative process monitor is created, the administrative data storage can have computer instructions to perform the steps of an administrative task device.

Once the administrative process monitor is created, the administrative data storage can have computer instructions to perform the steps of an administrative task transfer device.

The administrative data storage can contain computer instructions 92 for forming an administrative database.

The administrative data storage can include computer instructions 93 for forming an administrative web server to receive and store information transmitted over the network and to provide storage in the administrative data storage.

A plurality of administrative configuration libraries 83 can be stored in the administrative data storage. The administrative configuration libraries can include an administrative process monitor configuration library 84, an administrative site monitor configuration library 86, an administrative task device configuration library 88, and an administrative task transfer device configuration library 90.

It should be noted that the administrative database can store information from a site via a site to administrative server network, which can be a satellite network, the Internet, a cellular network, another wireless network, or combinations of networks.

The administrative data storage can include computer instructions 110 for receiving, verifying and storing at least one tension rope signal that is transmitted from the site to the administrative web server via the network.

The administrative data storage can include computer instructions 112 for receiving, verifying and storing heave data for a predetermined unit of time that is transmitted from the site to the administrative web server via the network.

The administrative data storage can include computer instructions 114 for calculating applied tension from tensioner pressures and tensioner information.

The administrative data storage can include computer instructions 116 for taking samples of average heave data and calculating the combined average heave data and heave count over a specified unit of time.

In the administrative data storage are computer instructions 117 for combining the tension rope tension, combined heave data and the heave count for a preselected unit of time with site configuration information, the site configuration information comprising well information, tensioner information and tension rope information, to estimate damage to the tension rope of the tensioner assembly at the site.

The administrative data storage can include computer instructions 540 for presenting the estimated damage to the tension rope comprising: (i) percentage of wear remaining, (ii) tensioner status, (iii) estimated cut (or replace) date, and (iv) tensioner information.

The administrative data storage can include computer instructions 87 to display tensioner names in a drop down box using select tensioner detail button.

The administrative data storage can include computer instructions 89 to update appropriate fields of a selected tensioner name displayed in a select tensioner detail button using a change tensioner detail button.

The administrative data storage can include computer instructions 91 for linking to a calendar for selecting a new damage date using new damage date button.

The administrative data storage can include computer instructions 94 to display damage detail information for the date displayed in a new damage date button using a change damage date button.

The administrative data storage can include computer instructions 95 to call for the computation of tension rope damage and to clear dates displayed in the pending tensioner processing display using compute damage button.

The administrative data storage can include computer instructions 99 to connect to a maintenance menu usable to maintain tensioners configuration and maintain the well and tension rope information using a maintenance menu button.

The administrative data storage can include computer instructions 900 to replace a combined average period (per day) with a new combined average period using a save period only button.

The administrative data storage can include computer instructions 902 to replace average tension in kips with new tension in kips for each tensioner using a save tensioner only button.

The administrative data storage can include computer instructions 904 to save both combined average period and average tension in kips, namely, replacing a period with a new period using a save all button while simultaneously replacing tension in kips with new tension in kips for each tensioner.

The administrative data storage can include are computer instructions 906 to calculate all pending damage processing using a recompute button.

The administrative data storage can include computer instructions 908 to cancel (throw away) any input and refresh the screen using a cancel button.

The administrative data storage can include computer instructions 910 to link to a calendar using a new processing date button.

The administrative data storage can include computer instructions 912 to update the display with data associated with the date selected in the new processing date button using a change date button.

The administrative data storage can include computer instructions 920 for maintaining the status of each tensioner by initially assigning a tension rope to a tensioner, recording the date if a tension rope has been slipped and cut, recording the date and new tension rope name if a tension rope has been replaced, or recording dates when the individual tensioner is out of service.

The administrative data storage can include computer instructions 922 for identifying new tension ropes to the system. This can include rope specifications, certification numbers, and other desired information.

The administrative data storage can include computer instructions 924 for identifying well drilling programs to the system. This can include well start date, estimated end of well date, actual end of well date, and dates where the riser was not under tension.

The administrative data storage can include computer instructions 926 for identifying the initial parameters of each tensioner. This can include the tensioner identifier (name), the corresponding pressure measuring device, the required length of tension rope and other information.

The administrative data storage can include computer instructions 928 for implementing the user defined general damage formula.

The administrative data storage can include computer instructions 929 for storing the specific formula coefficients with selection identifiers.

The administrative data storage can include computer instructions 930 for presenting the daily tensioner history of each tensioner.

The administrative data storage can include computer instructions 932 for recording user defined tension rope inspection reports. Inspection reports can include initial inspection, daily inspection, and final inspection reports.

The administrative data storage can include computer instructions 934 for presenting tension rope history. The presentation can include damage history, length of service and inspection reports.

FIG. 5 is a diagram of components within the administrative database 85. The administrative database 85 can include a plurality of site data 97, site configuration information 106, and site computed data 125.

The site computed data can include tension data 115*a*, combined heave data 115*b*, combined tension rope data 115*c*, tension rope damage data 115*d*, tensioner data 115*e*, heave count data 115*f*, and combinations thereof.

The plurality of site data 97 can include at least one tension rope signal 96, at least one heave data 123, at least one message 98, and/or at least one report 100. The at least one message can include at least one message from the floating site and at least one message from the administrative server. The at least one report can include at least one report from the floating site and at least one report from the administrative server.

The site configuration information 106 can include site information 101, well information 102, tensioner information 108, user security information 107, and tension rope information 122. The tension rope information can have a user supplied formula.

In one or more embodiments the administrative database can also contain computer instructions to for combining the plurality of site data with site configuration information to generate the site computed data including tension data, tension rope damage data, tensioner data, tension rope data, heave count data, and combinations thereof.

Figure 6:
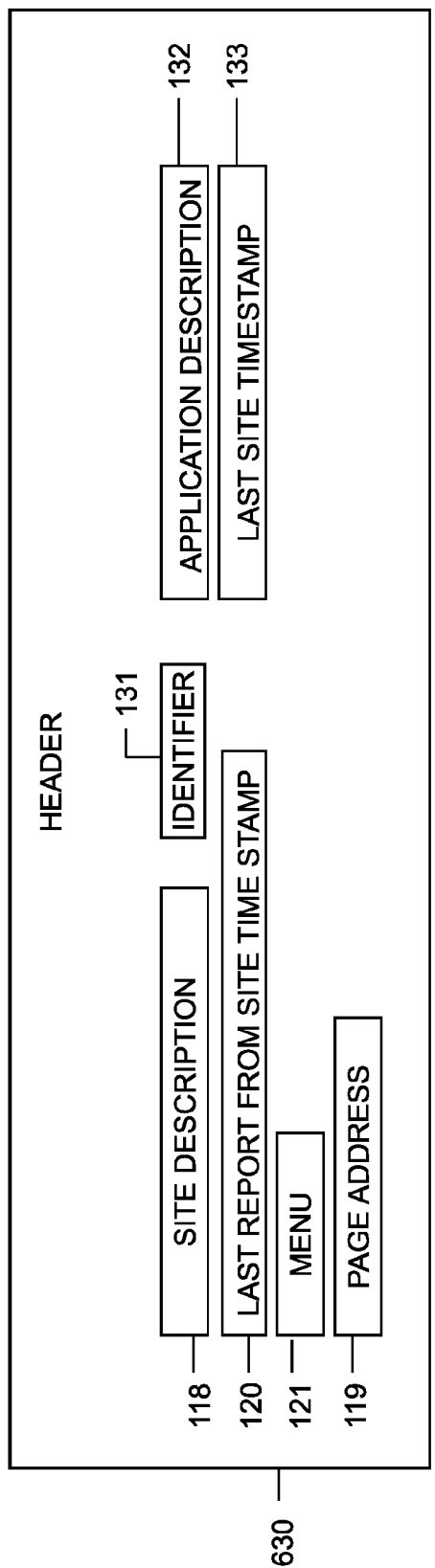
FIG. 6 displays a header usable with displays presented by the system.

FIG. 6 displays a header usable with displays presented by the system.

The header 630 can have a site description 118, an application description 132, and an identifier 131, which can be a picture or image of the floating site identified in the site description 118.

Also the header can have a last report from site time stamp 120 for the last report received from the floating site, a last site time stamp 133 which was the last time the shore communicated with the offshore floating site.

The header can include a menu 121, for selecting other reports and displays and a page address 119 to help the user identify the current web page.

The term "application description" as used herein refers to the name of the software product overall.

The term "site description" as used herein refers to the name of a rig, such as Bullwinkle.

Figure 7C:
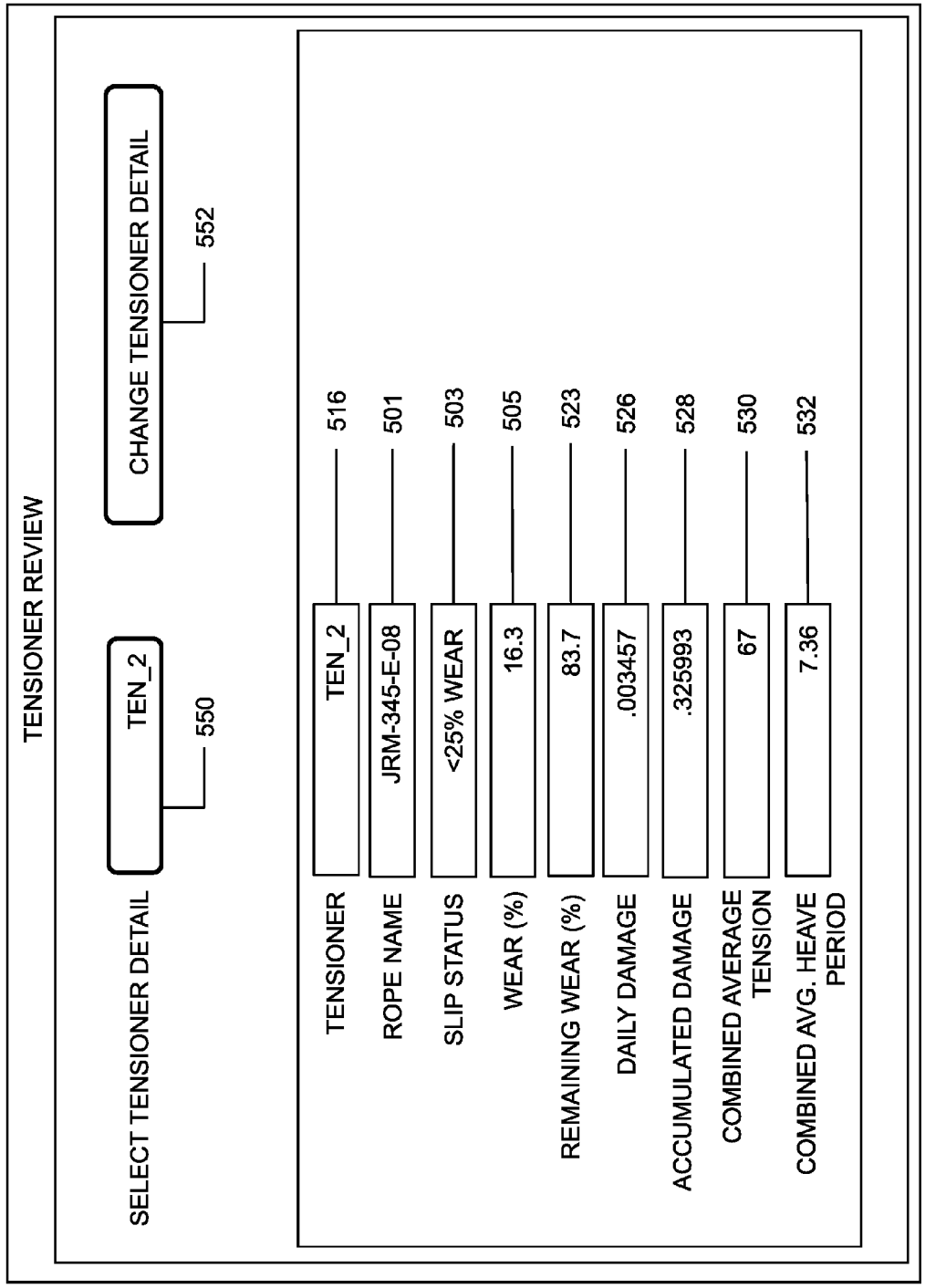
Figure 7D:
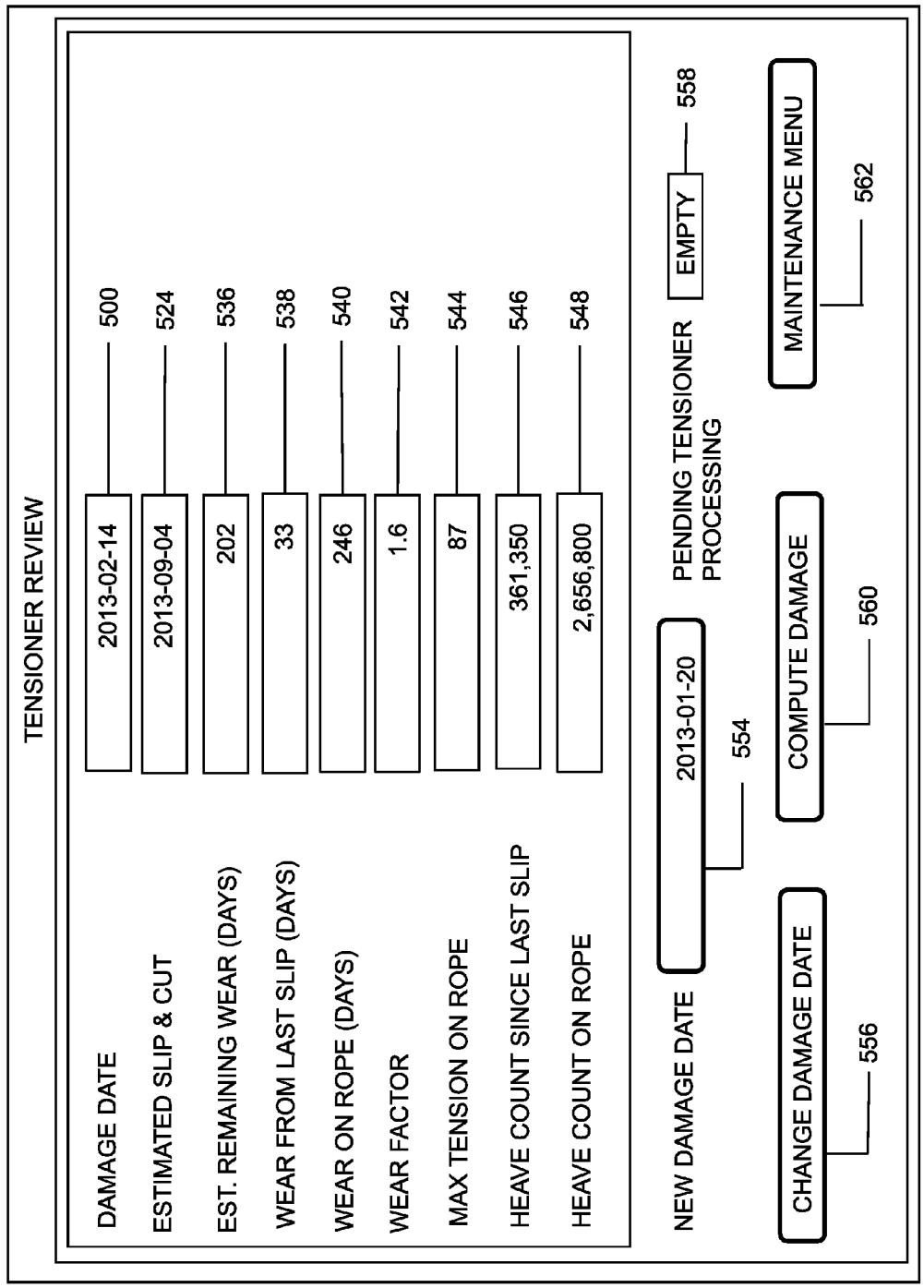

FIGS. 7A-7D are a display of a web page produced by the system depicting a review of tensioner information for all tensioners at a floating site. FIG. 7A displays the most critical tensioner, FIG. 7B depicts a status summary 541 of all tensioners, and FIGS. 7C and 7D show the details associated with a selected tensioner.

FIG. 7A shows a portion of the web page showing tension damage results for an individual tensioner with the most tension rope wear, which is known as the most critical tensioner, as computed by the system using computer instructions outlined herein.

These results can include a damage date 572, such as Jan. 1, 2013; a tensioner name 574, such as TEN_1; a wear percentage 576, such as 36.7 percent; a days on tension 578, such as of 96; a slip status 580, such as less than 50 percent wear; an estimated days remaining 582, such as 262; and an estimated end date 584, such as Sep. 19, 2013.

FIG. 7B is a display of another portion of the web page produced by the system depicting the status summary 541 for all tensioners at a site.

This Figure is a status summary for all tensioners in a tabular format. Four tensioners are shown in this status summary. The status summary can include tensioner names 516, such as TEN_1, TEN_2, TEN_3, and TEN_4.

The status summary can include a slip status 518, such as less than 50 percent wear and less than 25 percent wear.

The status summary can include days from last slip 520, such as 154 days and 96 days.

The status summary can include wear remaining in percent 522, such as 68.1 percent, 78.1 percent and 83.1 percent.

The status summary can also include an estimated cut date 524 by year, month, and day, shown as 2014-04-27, 2014-05-01, 2014-08-81, and 2014-05-11.

FIGS. 7C and 7D depict another portion of a web page produced by the system depicting details of an individual tensioner from the group of tensioners.

This portion of the web page can allow a user to select a tensioner name from a drop down box 550 of all tensioners in the database of the administrative server and display details of the selected tensioner. The drop down box can work in conjunction with a change tensioner detail button 552 that connects to computer instructions 89 in the administrative server to update the detail displays of a selected tensioner name.

The computer instruction can present detail results for an individual tensioner. The results can include a tensioner name 516, such as TEN_2; a rope name 501, such as JRM-345-E-08; a slip status 503, such as less than 25 percent wear; a wear percentage 505, such as 16.3 percent; a remaining wear percentage 523, such as 83.7; a daily damage 526, such as 0.003457; an accumulated damage 528, such as 0.325993; a combined average tension 530, such as 67; and a combined average heave period 532, such as 7.36.

The results can also include a damage date 500, such as 2013-02-14; an estimated slip and cut 524, such as 2013-09-04; an estimated remaining wear (days) 536, such as 202; a wear from last slip (days) 538, such as of 33; a wear on rope (days) 540, such as 246; a wear factor 542, such as 1.6; a max tension on rope 544, such as 87; a heave count since last slip 546, such as 361,350; and a heave count on rope 548, such as 2,656,800.

A pending tensioner processing display 558 can present a drop down box of dates which are dates that have pending damage processing that require damage recalculation. If the pending processing field displays "EMPTY" then no pending damage processing is required.

Various processing buttons can also be presented.

The web page can include a new damage date button 554 that links to a calendar and computer instructions to select a date in the past.

The web page can also include a change damage date button 556, compute damage button 560, and maintenance menu button 562.

Each button connects to computer instructions in the administrative processor. The change damage date button 556 connects to computer instructions 91 linking to a calendar for selecting a new damage date using the new damage date button.

The compute damage button 560 connects to computer instructions 95 to compute damage and to clear dates displayed in the pending tensioner processing display.

Maintenance menu button 562 connects to computer instructions 99 to connect to a maintenance menu usable to maintain tensioner configuration and maintain the well and tension rope information.

Figure 8:
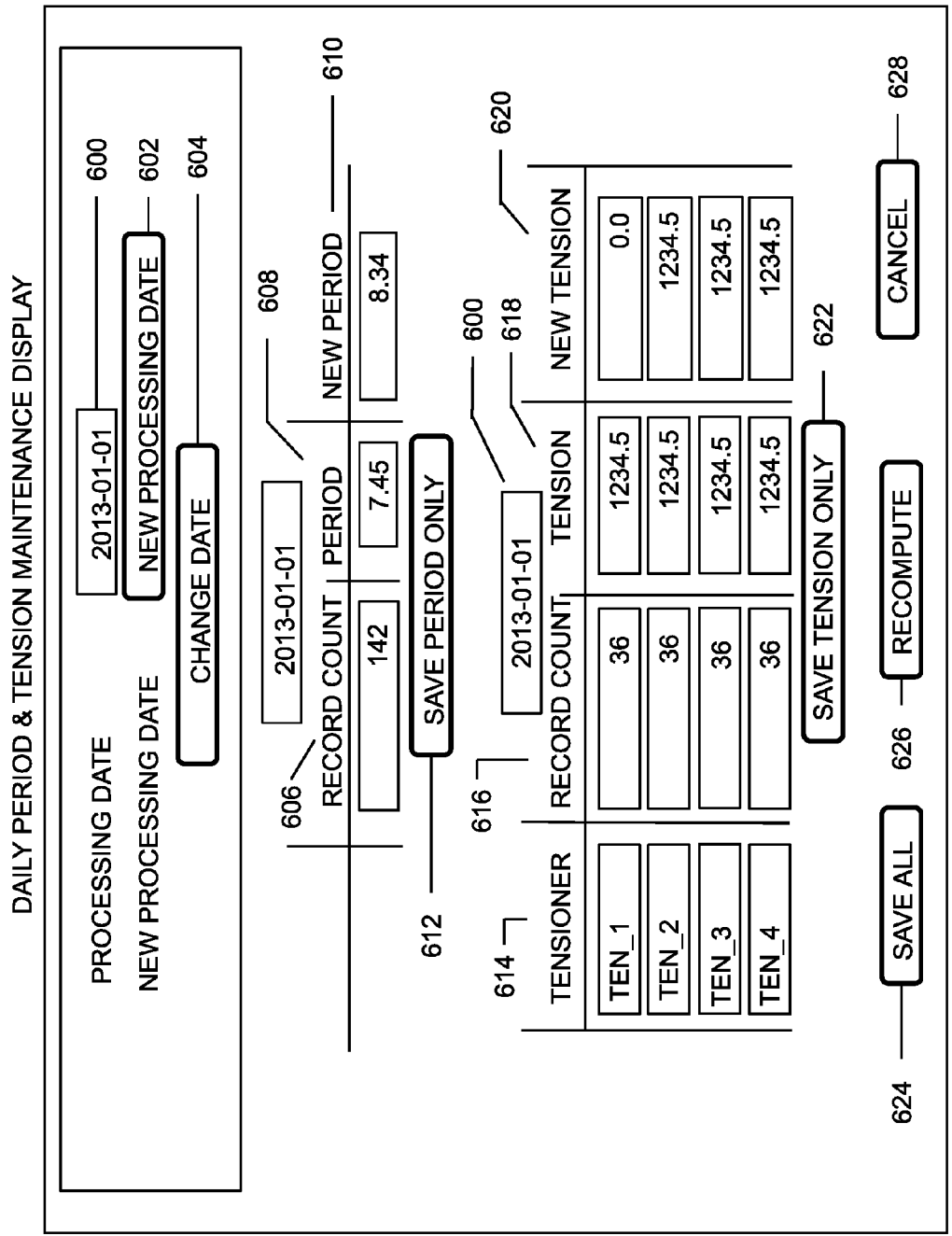
FIG. 8 is a representation of a display produced by the system for viewing heave periods and tension values for a specific unit of time with a start time and an end time.

FIG. 8 is a representation of a display produced by the system for viewing heave periods and tension values for a specific unit of time with a start time and an end time.

FIG. 8 shows a daily period and tension maintenance display with a processing date 600 used to display the period and tension information for that date.

The display can include a processing date button 602 that connects to computer instructions 910 to link to a calendar and computer instructions to select a date in the past.

The display can include a change date button 604 that connects to computer instructions 912 to display period and tensioner data for a selected date using the new processing date button 602.

The display can include record count 606, period 608 in seconds, and new period 610 in seconds. A save period only button 612 is also shown. The record count is the number of site data samples used to compute the combined average period.

The save period only button 612 connects to computer instructions 900 to replace a combined average period per user defined period of time with a new combined average period.

A summary of tensioner names 614, record count 616, tension in kips 618 and new tension in kips 620 are also shown in FIG. 8.

A save tension only button 622 that connects to computer instructions 902 to replace tension in kips with new tension in kips for each tensioner is also shown. The record count is the number of site data samples used to compute the combined average tension.

A save all button 624 that links to computer instructions 904 to save both period in seconds and tension in kips, namely, replacing the period with a new period while simultaneously replacing tension in kips with new tension in kips for each tensioner.

A recompute button 626 that links to computer instruction 906 to calculate all pending damage processing is shown.

A cancel button 628 that links to computer instructions 908 to cancel (throw away) any input without any update and refresh the screen is also shown.

Figure 9:
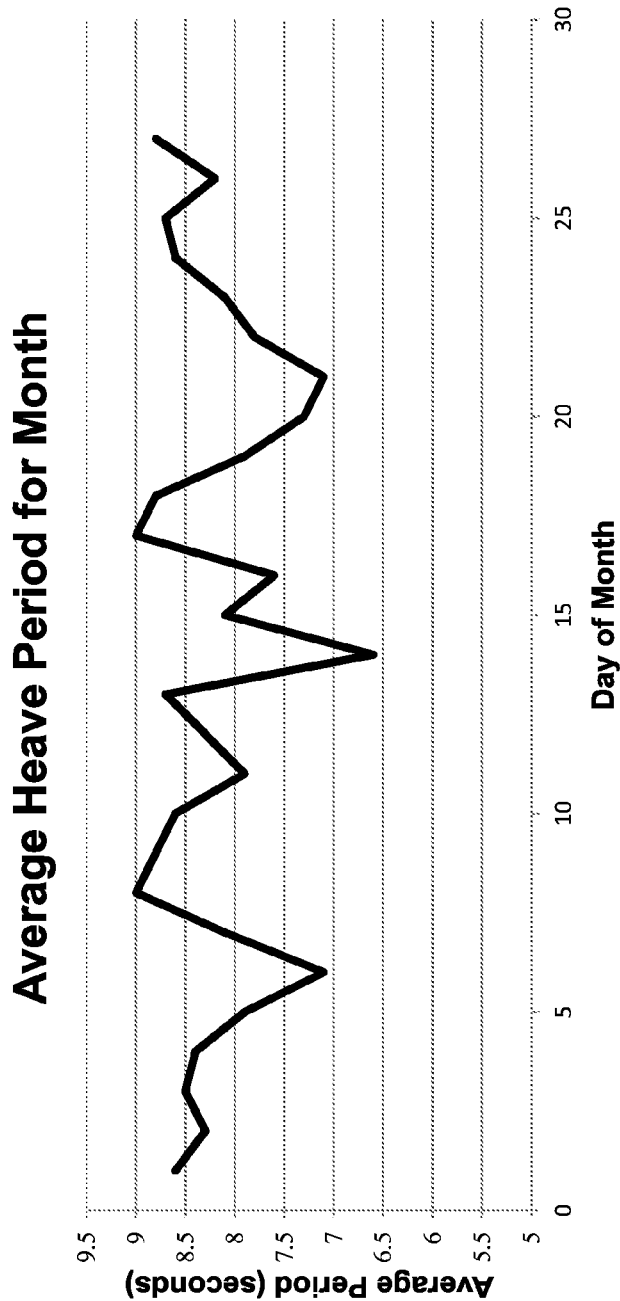
FIG. 9 is an exemplary graph of a heave period computed by the system over a 30 day period.

FIG. 9 is a graph of a daily heave period computed by the system over a 30 day period. It shows an average period in seconds of heave computed against days of the month for daily intervals.

Figure 10:
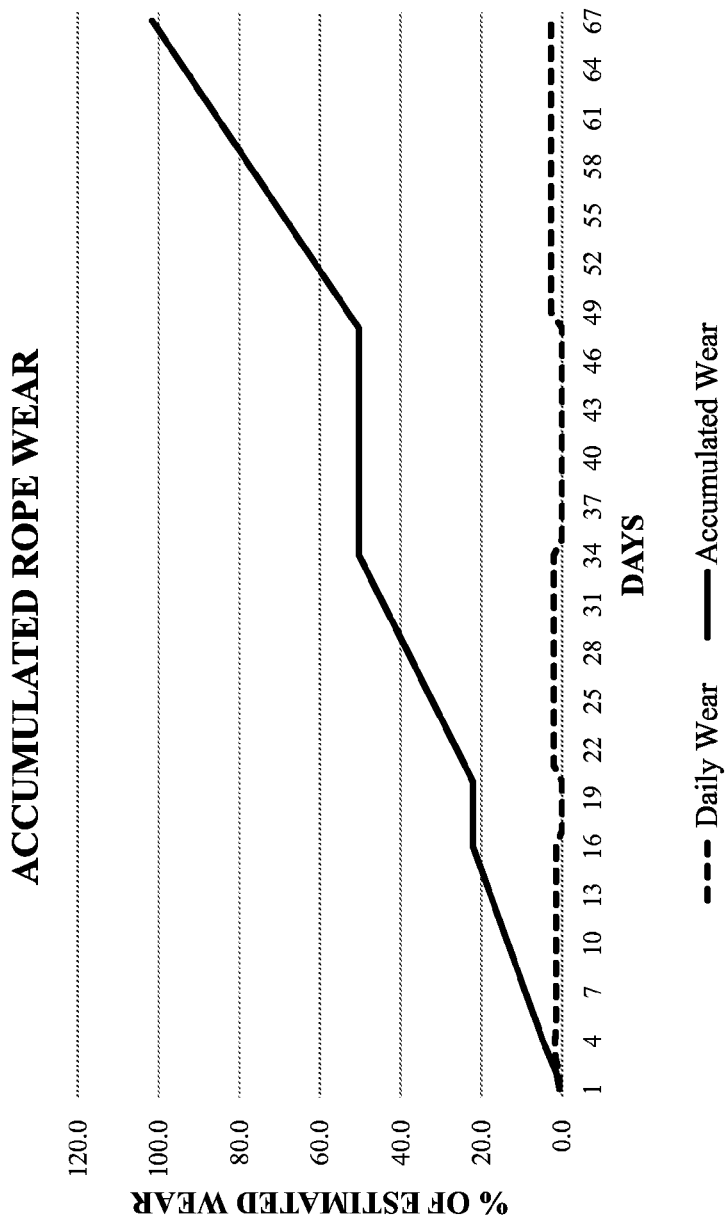
FIG. 10 is an exemplary graph of computed tension rope wear computed by the system over a 67 day period and the rope is 100 percent used.
Figure 11B:
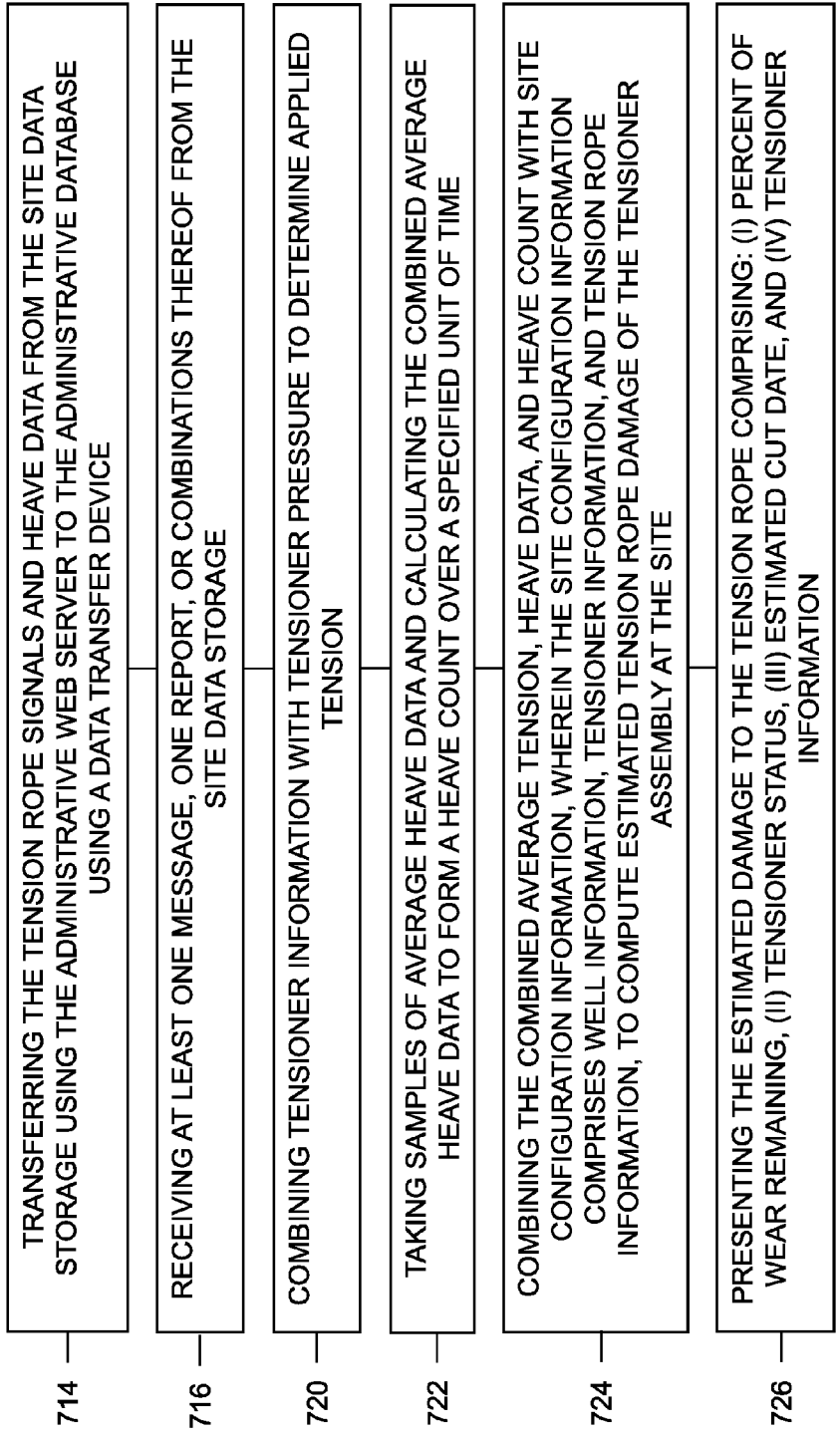

FIG. 10 is a graph of computed tension rope wear computed by the system over a 67 day period. The rope has experienced 100 percent wear over the period. It shows a percent of estimated wear on the rope against calendar days. FIGS. 9 and 10 show the significant benefits of using this system and method.

FIGS. 11A-11D depict the sequence of steps usable in an automated method for determining damage to tensioner ropes and tracking movement of a floating site using the system.

The method can include forming a database for tension rope signals and accelerometer signals for a floating site in a site data storage connected to a site processor, as shown in step 700.

The method can include installing a plurality of site configuration libraries in the database, as shown in step 702.

The method can include receiving and storing tension rope signals into the database for at least one tensioner rope sensor and receiving and storing accelerometer signals from an accelerometer on the floating site, as shown in step 704.

The method can include verifying that the tension rope signals and accelerometer signals have been received by the site data storage, as shown in step 705.

The method can include computing heave data comprised of average period and average distance travelled by the floating oil rig for a preselected unit of time from the accelerometer signals for a floating site, as shown in step 706.

The method can include connecting an administrative server to the site processor, wherein the administrative server has an administrative data storage, an administrative processor and an administrative database, as shown in step 708.

The method can include installing a plurality of configuration libraries in the administrative server, as shown in step 710.

The method can include forming an administrative web server in the administrative server, as shown in step 713.

The method can include transferring the tension rope signals and heave data from the site data storage using the administrative web server to the administrative database using a data transfer device, as shown in step 714.

The method can include receiving at least one message, one report, or combinations thereof from the site data storage, as shown in step 716.

The method can include combining tensioner information with tensioner pressure to determine applied tension, as shown in step 720.

The method can include taking samples of average heave data and calculating the combined average heave data to form a heave count over a specified unit of time, as shown in step 722.

The method can include combining the combined average tension, heave data, and heave count with site configuration information, wherein the site configuration information comprises well information, tensioner information, and tension rope information, to compute estimated tension rope damage of the tensioner assembly at the site, as shown in step 724.

The method can include presenting the estimated damage to the tension rope comprising: (i) percent of wear remaining, (ii) tensioner status, (iii) estimated cut date, and (iv) tensioner information, as shown in step 726.

The method can include presenting the combined average period and combined average tension for each tensioner for a selected processing date and providing a method to change the values, as shown in step 728.

The method can include maintaining the status of each tensioner by initially assigning a tension rope to a tensioner, recording the date if a tension rope has been slipped and cut, recording the date and new tension rope name if a tension rope has been replaced, or recording dates when the individual tensioner is out of service, as shown in step 730.

The method can include identifying new tension ropes to the system, as shown in step 732. This can include rope specifications, certification numbers, and other desired information.

The method can include identifying well drilling programs to the system, as shown in step 734. This can include well start date, estimated end of well, actual end of well, and dates that the riser was not under tension.

The method can include identifying the initial parameters of each tensioner, as shown in step 736. This can include the tensioner identifier (name), the corresponding pressure measuring device, the required length of tension rope and other information.

The method can include implementing the user defined general damage formula, as shown in step 738.

The method can include storing the specific formula coefficients with selection identifiers, as shown in step 739

The method can include using computer instructions for presenting the daily tensioner history of each tensioner, as shown in step 740.

The method can include using computer instructions for recording user defined tension rope inspection reports, as shown in step 742. Inspection reports can include initial inspection, daily inspection, and final inspection reports.

The method can include using computer instructions for presenting tension rope history, as shown in step 744. The presentation can include damage history, length of service and inspection reports.

While these embodiments have been described with emphasis on the embodiments, it should be understood that within the scope of the appended claims, the embodiments might be practiced other than as specifically described herein.

What is claimed is:

1. A system to monitor from a secondary location a status of a tensioner assembly at a site, the tensioner assembly comprising: at least one tensioner and a tension rope and the status of a rig motion assembly comprising at least one accelerometer, the system simultaneously enabling monitoring and preventive maintenance, wherein the system comprises:
   a. at a site:
      (i) a data acquisition hardware for receiving and storing sensor data from a tensioner rope sensor attached to the tensioner pressure line to monitor tensioner pressure and produce tension rope signals, and an accelerometer within a rig motion assembly attached to a floating oil rig to monitor acceleration of the floating oil rig producing acceleration signals in a translational direction;
      (ii) a site processor in communication with a site data storage for receiving tension rope signals and acceleration signals in a translational direction;
      (iii) an analog input monitor connected to the site processor;
      (iv) a data transfer device connected to the site processor;
      (v) a site task device connected to the site processor;
      (vi) a site process monitor in the site data storage;
      (vii) the site processor executes computer instructions stored on the site data storage comprising:
      (viii) computer instructions in the site data storage forming a site database for the tension rope signals, acceleration signals in a translational direction, the computed heave data, the messages, and reports;
      (ix) computer instructions to compute heave data using signal processing techniques consisting of average period and average distance travelled for the site using the acceleration signals in a translational direction for a preselected unit of time;
      (x) computer instructions to create and store at least one report from the analog input monitor, the data transfer device, the site task device, and the site process monitor;
      (xi) computer instructions creating and storing at least one message from the analog input monitor, the data transfer device, the site task device, and the site process monitor;
      (xii) computer instructions in the site data storage to allow web access to the site data storage;
      (xiii) computer instructions in the site data storage to receive a request for site processor status; and
      (xiv) the site date storage further comprises a plurality of site configuration libraries containing site configuration information;
   b. at a secondary location:
      (i) an administrative server comprises an administrative processor; and
      (ii) an administrative data storage in the administrative server, wherein the administrative data storage comprises:
         1. an administrative process monitor;
         2. an administrative site monitor;
         3. an administrative task device;
         4. an administrative task transfer device;
         5. a plurality of administrative configuration libraries;
      (iii) the administrative server executes computer instructions stored on the administrative data storage comprises:
         1. computer instructions forming an administrative database, wherein the administrative database stores tension rope signals and heave data;
         2. computer instructions forming an administrative web server and storing information transmitted over the network;
         3. computer instructions receiving, verifying, and storing at least one tension rope signal;
         4. computer instructions receiving, verifying and storing a heave data that is transmitted from the site to the administrative web server via the network;

5. computer instructions calculating applied tension from tensioner pressures and tensioner information;
6. computer instructions taking samples of average heave data and calculating the combined average heave data and heave count over a specified unit of time;
7. computer instructions combining the tension rope tension, combined heave data, and heave count for a preselected unit of time with site configuration information, the site configuration information comprising well information, tensioner information and tension rope information, to estimate tension rope damage to the tension rope of the tensioner assembly at the site; and
8. computer instructions presenting the estimated damage to the tension rope for the tensioner assemblies comprising: (i) percentage of wear remaining, (ii) tensioner status and (iii) estimated cut (or replace) date, and (iv) tensioner information; and c. a plurality of client devices in communication with the administrative server, wherein each user client device is in communication with a network, wherein each user client device comprises a user display, a user processor, and a user data storage in communication with the user processor, for viewing status of the estimated damage remote to the drilling site.

2. The system of claim 1, wherein the analog input monitor comprises:
   a. computer instructions in the site data storage receiving tension rope signals and acceleration signals from the data acquisition hardware; and
   b. computer instructions in the site data storage to store the tension rope signals and acceleration signals.

3. The system of claim 1, wherein the data transfer device comprises:
   a. computer instructions transmitting tension rope signals, heave data, and at least one report or at least one message all of the programs running on the site processor to the administrative server;
   b. computer instructions in the site data storage to verify a transfer of the tension rope signals, heave data, and reports and messages, or combinations thereof; and
   c. computer instructions in the site data storage to mark the tension rope signals, heave data, reports and messages, or combinations thereof.

4. The system of claim 1, wherein the site task device comprises:
   a. computer instructions to generate a report;
   b. computer instructions to execute an operating system utility command; and
   c. computer instructions to perform another computer system maintenance activity.

5. The system of claim 1, wherein the site process monitor comprises computer instructions in the site data storage to monitor a status of the analog input monitor, the data transfer device, the site task device, or combinations thereof.

6. The system of claim 1, wherein the plurality of site configuration libraries comprise:
   a. a tensioner pressure configuration library;
   b. an acceleration configuration library;
   c. a site task device configuration library;
   d. a data transfer device configuration library;
   e. a site process monitor configuration library; or
   f. combinations thereof.

7. The system of claim 1, wherein the plurality of administrative configuration libraries comprise:
   a. an administrative process monitor configuration library;
   b. an administrative site monitor configuration library;
   c. an administrative task device configuration library; and
   d. an administrative task transfer device configuration library.

8. The system of claim 1, wherein the computer instructions presenting the display header to the user comprise:
   a. computer instructions to present a site description;
   b. computer instructions to present a page address;
   c. computer instructions to present a last report date and time from the site;
   d. computer instructions to present a menu of reports, a presentation, a documentation, or the user administration item for selection by the user;
   e. computer instructions enabling the user to view an identifier (typically an image) for a site being monitored;
   f. computer instructions presenting a time stamp to the user indicating when information to a requested response was provided to the administrative server from the site processor; and
   g. computer instructions providing an application description.

9. The system of claim 1, wherein the computer instructions tensioner review additionally display tensioners with tension rope having greatest wear.

10. The system of claim 1, wherein the computer instructions to form a web page further comprise:
    a. a damage date which identifies the date of the information on the web page;
    b. a tensioner name;
    c. a percentage of estimated life expected of the tension rope used based on an accumulated damage;
    d. a count of the days a tension rope has been in use;
    e. a user defined status based on percentage of wear of the tension rope;
    f. an estimated number of the days a tension rope has remaining before it reaches percent estimated wear calculated from number days used and the current percentage of wear accumulated; and
    g. an estimated date of percent wear from number days used, the current percentage of wear accumulated, and assuming continuous use in the future.

11. The system of claim 10, wherein the computer instructions to form a web page further comprise a status summary for all tensioners being monitored by the system.

12. The system of claim 11, wherein the status summary comprises:
    a. a tensioner name;
    b. a slip status;
    c. a days from last slip count;
    d. a percentage of wear remaining on a tensioner rope; and
    e. an estimated slip and cut date.

13. The system of claim 10, wherein the computer instructions to form a web page further comprise selected tensioner detail comprising:
    a. a tensioner name;
    b. a rope name;
    c. a slip status;
    d. a wear percentage;
    e. a remaining wear percentage;
    f. a daily damage;
    g. an accumulated damage;
    h. a date's average tension;
    i. a date's average heave period;
    j. a damage date;
    k. an estimated slip and cut (or replace);
    l. days of wear remaining on a tensioner rope;

m. a wear from last slip in days;
n. a day of wear counted on a tensioner rope;
o. a wear factor;
p. a max tension on rope;
q. a heave count since last slip; and
r. a heave count on rope.

14. The system of claim 1, further comprising computer instructions to form action buttons consisting of:
   a. a drop down box containing the list of tensioner names;
   b. a change tensioner detail button to populate the tensioner detail of the selected tensioner from the drop down tensioner names;
   c. a new damage date button to select a date to review the tensioner damage information;
   d. a change damage date button to refresh the web page with tensioner damage information for the date selected in the new damage date button;
   e. a drop down display to identify dates with pending tensioner processing, wherein if no processing is pending, the drop down display shows EMPTY;
   f. a compute damage button that calls the tensioner damage processing method and repopulates the pending tensioner processing drop down box; and
   g. a maintenance menu button linked to tensioner configuration maintenance and the well and tension rope maintenance menu.

15. The system of claim 1, wherein the combined average tension and combined average heave data displays include:
   a. a processing date which identifies the date of the information being presented;
   b. a number of short intervals used to compute the combined average period;
   c. a combined average period;
   d. a replacement for the combined average period;
   e. a tensioner name;
   f. a number of short intervals used to compute the combined average tension
   g. a combined average tension; and
   h. a replacement for the combined average tension.

16. The system of claim 1, wherein computer instructions presenting the combined average period and combined average tension for each tensioner further comprise computer instructions to form action buttons consisting of:
   a. a new processing date button to select a different processing date;
   b. a change date button to refresh the display with the period and tension data of the date selected by new processing date button;
   c. a save period only button that saves new period into combined average period and refreshes the display with the processing dates information;
   d. a save tension only button saves the new tension into combined average tension for each tensioner and refreshes the display with the processing dates information;
   e. a save all button saves both the new period into the combined average period and the new tension into combined average tension for each tensioner and refreshes the display with the processing dates information;
   f. a recomputed button calls the damage processing; and
   g. a cancel button discards any entry and refreshes the display with the processing dates information.

17. The system of claim 1 comprising as the site configuration information a member of the group comprising: site information, well information, tensioner information, user security information, tension rope information and combinations thereof.

18. The system of claim 1, wherein the administrative database comprises site computed data that includes combined average tension data, combined average heave data, tension rope data, tension rope damage data, tensioner data, heave count, and combinations thereof.

19. The system of claim 1, wherein the message comprises site messages, administrative messages, and combinations thereof.

20. The system of claim 1, wherein the administrative database comprises site and administrative reports which comprise site reports, administrative reports, and combinations thereof.

21. The system of claim 1, further comprising:
   a. computer instructions to maintain the status of each tensioner by initially assigning a tension rope to a tensioner, recording the date if a tension rope has been slipped and cut, recording the date and new tension rope name if a tension rope has been replaced, or recording dates when the individual tensioner was out of service;
   b. computer instructions identifying new tension ropes to the system;
   c. computer instructions identifying well drilling programs to the system;
   d. computer instructions identifying the initial parameters of each tensioner;
   e. computer instructions implementing the user defined general damage formula;
   f. computer instructions storing the specific formula coefficients with selection identifiers;
   g. computer instructions presenting the daily tensioner history of each tensioner;
   h. computer instructions recording user defined tension rope inspection reports; and
   i. computer instructions presenting tension rope history.

* * * * *